United States Patent [19]
Vukasovich et al.

[11] 4,017,315
[45] Apr. 12, 1977

[54] MOLYBDATE-PHOSPHATE CORROSION INHIBITING PIGMENT

[75] Inventors: Mark S. Vukasovich, Ann Arbor; Francis J. Sullivan, Allen Park, both of Mich.

[73] Assignee: Amax Inc., New York, N.Y.

[22] Filed: June 27, 1975

[21] Appl. No.: 590,798

[52] U.S. Cl. .............................. 106/14; 106/193 J; 106/288 B; 106/292; 106/306; 252/387; 260/37 R; 260/37 EP; 260/37 N; 260/39 R; 260/40 R; 260/42.21

[51] Int. Cl.² .......................................... C09D 5/08

[58] Field of Search ................. 106/14, 288 B, 292, 106/306, 308 Q; 252/387

[56] References Cited

UNITED STATES PATENTS

| | | | |
|---|---|---|---|
| 3,353,979 | 11/1967 | Hunn | 106/292 |
| 3,726,694 | 4/1973 | Moore et al. | 106/14 |
| 3,846,148 | 11/1974 | Nordyke et al. | 106/288 B |
| 3,874,883 | 4/1975 | Robitaille et al. | 106/14 |

*Primary Examiner*—Lorenzo B. Hayes
*Attorney, Agent, or Firm*—Harness, Dickey & Pierce

[57] ABSTRACT

A corrosion inhibiting molybdate-phosphate pigment and protective coating formulations incorporating said pigment in which the proportions of the molybdate constituent and phosphate constituent are controlled on a pigment volume concentration basis of about 2 to about 3 parts molybdate per part phosphate.

11 Claims, No Drawings

MOLYBDATE-PHOSPHATE CORROSION INHIBITING PIGMENT

BACKGROUND OF THE INVENTION

Certain metallic molybdate and phosphate salts have been recognized for their ability to inhibit corrosion of ferrous substrates when incorporated as pigments in conventional and special coating formulations. Selected metal molybdate salts not only possess excellent corrosion inhibiting properties, but also provide advantages due to their non-toxicity and their neutral or white color, providing increased latitude in the formulation and use of such coating systems. In contrast, the more common corrosion inhibiting pigments, such as zinc chromate, basic lead silico chromate, dibasic lead phosphite and the like, are relatively restrictive in use due to their toxicity and/or their inherent dark colors. The effectiveness and desirable characteristics of typical molybdate-type corrosion inhibiting pigments are more fully described in U.S. Pat. Nos. 3,726,694 and 3,874,883, the teachings of which are incorporated herein by reference. In accordance with the teachings as set out in the aforementioned patents, the cost disadvantages normally associated with molybdate-type pigments relative to the more conventional prior art corrosion inhibiting pigments have to a great extent been overcome by various extender techniques enabling the use of substantially lesser quantities of the effective molybdate constituent to achieve equivalent corrosion inhibiting properties.

The present invention provides still further benefits in the use of such molybdate-type pigments by increasing their cost-effectiveness as a result of the discovery that superior synergistic corrosion inhibiting properties are derived by the combination of selected metallic molybdate salts with controlled proportions of selected metal phosphate salts without any sacrifice in the remaining beneficial properties of such molybdate pigments.

SUMMARY OF THE INVENTION

The benefits and advantages of the present invention are based on the discovery that a combination of selected metal molybdates and metal phosphate compounds in controlled proportions produces a corrosion inhibiting pigment possessing synergistic properties, providing for superior corrosion inhibition when incorporated in conventional and special coating formulations in comparison to that obtainable with equal volumes of either of these pigment materials used alone.

The metal molybdate constituent of the mixed corrosion inhibiting pigment is a compound selected from the group consisting of zinc molybdate, calcium molybdate, strontium molybdate, barium molybdate and mixtures thereof, of which zinc molybdate and/or calcium molybdate comprise the preferred compound. The metal phosphate compound is one selected from the group consisting of zinc phosphate, calcium phosphate, magnesium phosphate, as well as mixtures thereof, and of which zinc phosphate constitutes the preferred compound. The metal molybdate compound is present in a controlled proportion based on a pigment volume concentration basis of from about 2 parts up to about 3 parts per part of the metal phosphate compound present, with ratios of about 7 parts molybdate for each 3 parts phosphate being particularly effective.

The molybdate and phosphate constituents can be in the form of a mechanical mixture of particles composed of the two constituents which may range in size up to about an average particle size of 25 microns. Preferably, the molybdate constituent is present in the form of an extended pigment in which the molybdate constituent is disposed as an adherent coating on the surfaces of a compatible particulated carrier material such as talc, silica, metal carbonates, titanium dioxide and the like. The quantity of the metal molybdate coating on the carrier particles usually ranges from about 2% up to about 30% by weight of the total extended pigment weight. It is also contemplated that both the metal molybdate and metal phosphate compounds can be co-deposited in the form of an adherent coating on the surfaces of such compatible extender particles in appropriate proportions to provide the required relative pigment volume concentration ratio of the constituents.

The present invention also contemplates the formulation of protective corrosion inhibiting coatings comprising a liquid vehicle containing the corrosion inhibiting pigment of the present invention in combination with other conventional pigment materials and coating additives in which the corrosion inhibiting pigment is present in a concentration sufficient to impart effective corrosion inhibiting properties thereto.

Additional benefits and advantages of the present invention will become apparent upon a reading of the description of the preferred embodiments taken in conjunction with the specific examples provided.

DESCRIPTION OF THE PREFERRED EMBODIMENTS

The terminology "pigment volume concentration" for the purposes of this description and as set forth in the subjoined claims is intended to encompass the volume of particles which are composed entirely of the metal molybdate and metal phosphate compounds as well as the volume of particles having either and/or both of the metal molybdate and metal phosphate compounds deposited in the form of a coating on the surfaces of compatible carrier particles.

The synergistic corrosion inhibiting properties of the mixed metal molybdate salt and metal phosphate salt are achieved when the proportions of these two active constituents are controlled on a pigment volume concentration (PVC) basis, such that the molybdate salt is present in an amount of about two parts up to about three parts by volume of each part by volume of the phosphate salt present. Particularly satisfactory results are obtained when the molybdate salt is present in a ratio of about seven parts for every three parts of the phosphate salt. The molybdate salt is selected from the group consisting of zinc molybdate, calcium molybdate, strontium molybdate, barium molybdate, as well as mixtures thereof, and of which zinc molybdate and/or calcium molybdate are preferred. The phosphate salt is selected from the group consisting of zinc phosphate, calcium phosphate, magnesium phosphate, as well as mixtures thereof, of which the hydrated forms such as $Zn_3(PO_4)_2 \cdot 2H_2O$; $CaHPO_4 \cdot 2H_2O$, and $Mg_3(PO_4)_2 \cdot 8H_2O$ are preferred, with the zinc phosphate dihydrate being particularly satisfactory. Both the metal molybdate and metal phosphate salts are characterized as being nontoxic and of a neutral or white color, such that the resultant protective coating formulation incorporating the pigment can be compounded in any one of a variety of white or light colors and can be employed in applications in which the coating is exposed to human contact without any harmful effects.

The specific molybdate salt and phosphate salt of the mixed corrosion inhibiting pigment can be present in the form of a mechanical mixture of neat particles of each of these substances. For economic reasons, it is preferred that the molybdate compound be extended, whereby lesser quantities are necessary to provide equivalent corrosion inhibition. Satisfactory methods for producing such extended molybdate pigments are fully described in U.S. Pat. Nos. 3,726,694 and 3,874,883, which are assigned to the same assignee as the present invention. Briefly stated, the method as described in U.S. Pat. No. 3,726,694 effects the formation of a coating of the molybdate salt on at least a portion of the surfaces of a finely particulated inert and compatible carrier material by forming an aqueous slurry of the carrier particles to which an alkali metal molybdate salt and an aqueous soluble metal salt, such as metal halides, sulfates, nitrates, etc., are dissolved and whereby through a double decomposition reaction, the corresponding metal molybdate or mixed molybdate salts are precipitated or co-precipitated on the surfaces of the suspended carrier particles. In accordance with the teachings of U.S. Pat. No. 3,864,883, a particulated carrier material comprising a carbonated zinc, calcium, strontium and/or barium is slurried in an acidic aqueous solution in the presence of molybdic oxide in a manner so as to cause a reaction between the molybdate ions and the metallic ions on the surfaces of the carrier particles forming a chemically-bonded coating of the corresponding metal molybdate salt on the unreacted core of the carrier particles. Reference is made to the aforementioned United States patents for further details of the specific process techniques disclosed therein and the subject matter of which is incorporated in this application by reference.

The particulated carrier material which can be satisfactorily employed for extending the metal molybdate and/or metal phosphate compounds may comprise any one of a variety of substances which are compatible with the active corrosion inhibiting constituents deposited thereon and which do not adversely affect the chemical and physical properties of the resultant corrosion inhibiting coating composition, as well as coating formulations produced incorporating such pigment. In consideration of the foregoing, any one or combinations of two or more of the various filler pigments normally incorporated in coating compositions can be satisfactorily employed with the size and shape thereof varying within the parameters normally associated with filler pigments employed in accordance with known paint technology. It is usually preferred however that the particle configuration is selected so as to maximize surface area, thereby increasing availability of the active coating constituent thereon. Generally, the average particle size of the particulated carrier may range from about 0.1 micron to as high as about 25 microns, and preferably from about 0.2 microns to about 10 microns.

Of the known filler pigments suitable for use in paint formulations, the so-called extender-type pigments comprising insoluble, finely-divided solid powders which are wettable by the vehicle are particularly satisfactory and include barium sulfates, calcium sulfates including gypsum, terra alba, plaster of paris; calcium carbonate including whiting and chalk; magnesium carbonate, silicas including quartz and diatomaceous earth; magnesium silicates and related minerals such as talc and soapstone, kaolin clay, mica, pumice and the like. Of the foregoing, talc and silica constitute particularly satisfactory low-cost inert carrier materials, while calcium and zinc carbonate are particularly satisfactory for producing molybdate pigments in accordance with the teachings of U.S. Pat. No. 3,874,883.

The extended metal molybdate pigment may comprise particles having coatings of a single metal molybdate compound as well as coatings comprised of two or more of the selected metal molybdate compounds produced by a co-deposition or co-precipitation of two or more of the metal molybdates. For example, a co-deposition of a 50/50 mixture of zinc and calcium molybdate as a coating on an inert particle core has been found effective as a corrosion inhibiting constituent. Conventionally, the quantity of the active constituent coated on the carrier may range in amount up to about 30% and even greater. Usually, however, amounts above about 30% by weight are undesirable from an economic standpoint in comparison to the substantially equivalent performance obtained by extended pigments incorporating lesser quantities. For this reason, the active coating constituent is controlled within a range of at least about 2% up to about 30% by weight of the total pigment, while amounts ranging from about 10% and 25% are preferred.

While the metal phosphate constituent of the mixed corrosion inhibiting pigment can also be provided in an extended form, the lower cost of zinc and calcium phosphate generally does not economically justify the further costs in producing such as extended pigment. These material normally are introduced in the form of neat particles of each metal phosphate compound, as well as mechanical mixtures thereof, with average particle sizes up to about 25 microns. The particulated metal phosphate constituent can simply be blended or mechanically mixed with the molybdate pigment in an extended or non-extended form so as to provide the desired pigment volume concentration ratio. It is also contemplated that the metal phosphate constituent can be co-deposited or co-precipitated on a particulated compatible carrier, with the metal molybdate salt in amounts to provide an equivalent pigment volume concentration ratio.

In addition to the active metal molybdate and metal phosphate constituents, it is also contemplated that the mixed corrosion inhibiting pigment of the present invention can include controlled quantities of metal oxides such as zinc oxide either in the form of a mechanical mixture or by entrapment within the coating of extended pigments by concurrently slurrying such metal oxides with the particulated carrier material during the coating process. The quantity of such metal oxides when used may conveniently range from about 0.5% up to about 10% by weight based on the toal weight of the mixed corrosion inhibiting pigment. The particle size of such metal oxides is controlled within the same particle size range of the corrosion inhibiting pigment constituent.

When extended pigments are produced by the precipitation or co-precipitation of active constituents on the particulated carrier or by the reaction of molybdate ions with a metal carbonate carrier in an aqueous medium, it is usually necessary to subject the recovered solid particulated material to a drying step, such as by heating to a temperature usually ranging from about 100° C to about 150° C to effect a removal of the major portion of residual water entrapped therein. The substantially dry particulated pigment may further be subjected to a milling or pulverizing operation to break up any agglomerates that may have formed during the coating operation, such that the resultant mixed pigment is of a pigment size grade. Such pigments can also be subjected to a calcining step at an elevated temperature, usually ranging from about 350° C up to about 600° C, but below that at which a caking or fusion of the pigment particles occurs, to remove any residual entrapped water and may water of hydration. This is particularly desirable when such pigment is to be employed in the formulation of organic base coatings. For water-base paint formulations such as acrylic latex coatings, the calcining operation can usually be omitted without any adverse effects.

The resultant mixed molybdate-phosphate corrosion inhibiting pigment can be employed for compounding a variety of conventional as well as specialty type protective coating compositions or paints. The term "paint", as herein employed, is used in its broad sense to include any one of a variety of solid and liquid mixtures consisting essentially of a binder having the corrosion inhibiting pigment dispersed therethrough, and which upon the application to a substrate, is effective to form a thin protective film through which the corrosion inhibiting pigments is substantially uniformly dispersed. In liquid paint systems, the vehicle conventionally comprises the liquid portion of the pain composition and may be composed of any one of a variety of well known film-forming constituents or binders in combination with a volatile solvent or thinner to facilitate application of the coating to the substrate. Such solvents are adapted to evaporate during the drying or curing or the paint film or, alternatively, in some instances, may itself react with the binder constituent and become an integral portion thereof. In accordance with well known paint technology, the solvent or thinner may be completely omitted or reduced in amount in those situations in which the coating compositions are of the so-called hot-melt type or wherein they are adapted to be applied to a substrate utilizing an electrostatic spray or powder spray technique in which the thinning effect of such solvents is unnecessary.

In accordance with the foregoing, the binder may be one which forms a resultant protective film by either oxidation or polymerization of the constituents typical of which are binders such as drying oils, including modified drying oils; formaldehyde condensation resins, including phenolic, urea and triaziene resins; allyl resins and polyurethane resins. Additionally, the binder constituents may comprise those which form a protective film as a result of the evaporation of the volatile solvent constituent of the vehicle or by a congealing thereof from a hot-melt upon cooling, typical of which are nitrocellulose and other cellulose esters and ethers of the types employed in lacquer formulations, vinyl resins, styrene resins, and any one of a variety of the polyacrylates and polymethacrylates, rubber derivatives, polyamide resins and polyolefins, of which polyethylene is exemplary. Binders which form a film in response to a coagulation of the binder particles from a latex or dispersion of natural or synthetic binding agents in addition to resins such as polytetrafluoroethylene and high molecular weight vinyl resins including plastisols, which frequently require a subsequent heat treatment to effect a thermal fusion of the particles into a substantially continuous film, are also satisfactory for formulating protective coatings in accordance with the practice of the present invention. Particularly satisfactory results are obtained when the corrosion inhibiting pigment of the present invention is incorporated in water-base latex formulations incorporating acrylic polymers. Organic coating systems, including alkyd resins, modified alkyds including amine resins such as urea and melamine resins as well as epoxy and modified epoxy resins also produce protective coatings which benefit from the unique corrosion inhibiting characteristics of the pigment of the present invention.

Such protective coating formulations can be further include supplemental coating additives well known in the coating art including supplemental extender or color type pigments, plasticizing agents, driers, and in the case of water-base paints, certain emulsifying agents, stabilizers and anti-foam agents which are compartible with the molybdate-phosphate corrosion inhibiting pigment.

The quantity of the molybdate-phosphate corrosion inhibiting pigment incorporated in protective coating formulations may range from a pigment volume concentration (PVC) as low as about 2% to amounts as high as 50% and even greater. The specific amount will vary depending upon the particular coating formulation, the nature of the substrate over which it is to be applied, and the severity of the corrosive environment to which it is to be subjected during service.

In order to further illustrate the synergistic corrosion inhibiting properties of the molybdate-phosphate pigment comprising the present invention, the following example is provided. It will be understood that the specific formulations as illustrated are merely illustrative of the present invention and are not intended as being restrictive of the pigment composition and coating formulations as herein described and as set forth in the subjoined claims.

EXAMPLE 1

A series of acrylic latex primer formulations were prepared containing controlled amounts of corrosion inhibiting pigments which were applied to steel test panels and evaluated in accelerated salt-fog tests. Each of the five test formulations were prepared in accordance with conventional paint formulation techniques and were identical in composition with the exception of the type and/or proportions of the molybdate and phosphate corrosion inhibiting pigments employed. The composition of the five test formulations designated as Samples A–E are set forth in Table 1.

Table 1

| Ingredient, Parts/Wt. | Test Acrylic Primer Formulations Sample | | | | |
|---|---|---|---|---|---|
| | A | B | C | D | E |
| Water | 38.5 | → | | | |
| Dispersing Agent | 9.9 | → | | | |
| Surface Active Agent | 2.2 | → | | | |
| Defoaming Agent | 2.2 | → | | | |
| Thickening Agent | 65.7 | → | | | |
| Molybdate Pigment | 57.0 | — | 40.0 | 28.5 | 17.0 |
| Phosphate Pigment | — | 59.8 | 17.8 | 29.9 | 42.0 |

Table 1-continued
Test Acrylic Primer Formulations

| Ingredient, Parts/Wt. | Sample A | B | C | D | E |
|---|---|---|---|---|---|
| ZnO Pigment | 6.1 | → | | | |
| TiO$_2$ Pigment | 211.5 | → | | | |
| Mica | 26.0 | → | | | |
| CaCO$_3$ | 125.4 | → | | | |
| Acrylic Emulsion | 600.9 | → | | | |
| Defoaming Agent | 2.2 | → | | | |
| Ethylene Glycol | 22.0 | → | | | |
| Tributyl Phosphate | 5.0 | → | | | |
| Mildewcide | 2.0 | → | | | |
| Thickening Agent | 31.0 | → | | | |
| NH$_4$OH (28%) | As required | → | | | |

Each of the test samples was formulated to contain a total pigment volume concentration (PVC) equal to 34.3% with the inhibitive pigment comprising 5.1% PVC. Sample A is representative of a primer formulation containing only a molybdate pigment, while sample B is representative of a primer formulation containing only a phosphate pigment. Sample C corresponds to a protective corrosion inhibiting primer formulation containing a ratio of molybdate pigment to phosphate pigment of 7:3 in accordance with the present invention. Samples D and E also contain mixed molybdate and phosphate pigments, but at PVC ratios of 1:1 and 3:7 respectively, for comparative purposes with Sample C.

The dispersing agent listed in Table 1 comprises a sodium salt of a polymeric carboxylic acid available commerically from Rohm & Haas Company under the designation Tamol 731. The surface active agent also is commerically available from Rohm & Haas Company under the designation Trition CF-10 and comprises an alkyl aryl polyether. The defoaming agent comprised a material commerically available under the designation Nopco-NXZ, available from Nopco Chemical Company. The supplemental extender pigments comprising zinc oxide, titanium dioxide, mica and calcium carbonate are of commerical pigment grade. The acrylic emulsion vehicle comprised a 46% solids emulsion of an acrylic polymer commerically available from Rohm & Haas Company under the designation MV-1. The ethylene glycol constituent primarily serves as an anti-freeze agent, while the tributyl phosphate constituent functions as a coalescing agent. The mildewcide constituent comprises a 45% solution in propylene glycol of a non-toxic 2-n-octyl-4-isothiozolin-3-one available under the designation Skane M-8 from Rohm & Haas Company.

The phoshpate pigment comprised a pigment grade zinc phosphate [Zn$_3$(PO$_4$)$_2$·2H$_2$O] available under the designation of 0852 from Mineral Pigments Corporation. The molybdate pigment was of pigment grade prepared in accordance with the teachings of U.S. Pat. No. 3,874,883 being of an average particle size of 2.5 microns and containing 13.4 percent by weight of calcium molybdate on a calcium carbonate carrier and further incorporating about 11% zinc oxide. Each of the sample formulations were adjusted to a pH of 9.5 by the addition of an appropriate quantity of a 28% ammonium hydroxide solution.

Each of the sample formulations were spray-applied to cold-rolled steel test panels 3 inches by 9 inches in size (type Q panel No. S-39) so as to obtain a dry-film thickness of 2.0 mils. The coated panels were air dried at room temperature for one week, after which they were scribed by scoring the painted surface to the base metal in an "X" pattern. Four sets of the scribed panels were exposed to a 5% salt-fog atmosphere for time periods of 160, 320, 480 and 640 hours and were rated for blistering in accordance with ASTM Designation D-714-56, and for corrosion employing the salt-fog rating system as described in Table 2.

Table 2

| Salt-Fog Rating System Description |
|---|
| Unstripped Panels |

Overall Rating
ASTM Designation D-714-56 Type
    Size  Reference standards have been selected for four steps as to size on a numerical scale from 10 to 0 in which 10 represents no blistering. Blistering Standard 8 represents the smallest-size blister easily seen by the unaided eye. Blistering Standards 6, 4, and 2 represent progressively larger sizes.
    Frequency  Reference standards have been selected for five steps in frequency at each step in size, designated as follows:
        D = Dense    F = Few
        MD = Medium Dense  T = Trace
        M = Medium

| Stripped Panels |
|---|

Corrosion in Scribed Area Rating
  10 = corrosion in scribe only
  9 = corrosion, few spots, <⅛ inch in width
  8 = corrosion, many spots, <⅛ inch in width
  7 = corrosion, few spots, <¼ inch in width
  6 = corrosion, all along, <⅛ inch in width
  5 = corrosion, many spots, <¼ inch in width
      or few spots, <½ inch in width
  4 = corrosion, all along, <¼ inch in width
  3 = corrosion, many spots, <½ inch in width
  2 = corrosion, all along, <½ inch in width
  1 = corrosion, <¾ inch in width
  0 = corrosion, >¾ inch in width
Surface Corrosion Rating
  10 = no surface corroded        4 = 50–60% of surface corroded Table 2-continued

| Salt-Fog Rating System Description | |
|---|---|
| 9 = 0–10% of surface corroded | 3 = 60–70% of surface corroded |
| 8 = 10–20% of surface corroded | 2 = 70–80% of surface corroded |
| 7 = 20–30% of surface corroded | 1 = 80–90% of surface corroded |
| 6 = 30–40% of surface corroded | 0 = 90–100% of surface corroded |
| 5 = 40–50% of surface corroded | (total failure) |

Overall Rating
Rated on a scale of 0–10 by visual observation. 0 would indicate a total failure (completely corroded or nearly so) and 10 wound indicate a nearly corrosion-free panel.

The salt-fog rating preformance of the test panels coated with sample formulations A-D are summarized in Table 3.

Table 3
Salt-Fog Performance
Test Sample Formulations

| | 160 Hours | | | | 320 Hours | | | |
|---|---|---|---|---|---|---|---|---|
| | Un- | Stripped | | | Un- | Stripped | | |
| Sample | stripped Overall | In Scribe | Sur-face | Over-all | stripped Overall | In Scribe | Sur-face | Over-all |
| A | 4M | 9 | 9 | 9 | 4MD | 8 | 9 | 8 |
| B | 6M | 8 | 8 | 8 | 6M | 8 | 9 | 8.5 |
| C | 6F | 8 | 10 | 9 | 6M | 8 | 10 | 9 |
| D | 6M | 8 | 9 | 8.5 | 6M | 7 | 9 | 8 |
| E | 6M | 8 | 8 | 8 | 6M | 6 | 8 | 6 |

| | 480 Hours | | | | 640 Hours | | | |
|---|---|---|---|---|---|---|---|---|
| | Un- | Stripped | | | Un- | Stripped | | |
| Sample | stripped Overall | In Scribe | Sur-face | Over-all | stripped Overall | In Scribe | Sur-face | Over-al |
| A | 2MD | 7 | 7 | 7 | 2D | 5 | 7 | 6 |
| B | 6M | 6 | 8 | 7 | 4M | 5 | 7 | 6 |
| C | 8M | 6.5 | 10 | 8 | 6M | 5 | 9 | 7 |
| D | 6MD | 5 | 8 | 6.5 | 6MD | 3 | 6 | 4.5 |
| E | 6MD | 5 | 8 | 6.5 | 4D | 3 | 5 | 4 |

It is apparent from an evaluation of the data as set forth in Table 3 that sample C corresponding to a mixed molybdate-phosphate corrosion inhibiting pigment in accordance with the present invention provides superior overall corrosion and blister-resistance performance, particularly after 640 hours exposure in the salt-fog environment in comparison to the preformance provided by an equal amount on a PVC basis of the molybdate pigment by itself (sample A), the zinc phosphate pigment by itself (sample B) and mixtures of the molybdate and phosphate pigment (samples D and E) in which the ratio of the two active corrosion inhibiting constituents is outside the specific permissible proportions of the present invention. These test data clearly establish the synergistic properties of the mixed pigment composition of the present invention providing superior corrosion inhibition properties.

EXAMPLE 2

An extended molybdate-phosphate corrosion inhibiting pigment in which the metal molybdate and metal phosphate constituents are co-deposited on the surfaces of a calcium carbonate carrier particle is prepared by providing an aqueous solution to which a controlled quantity of $Na_2H(PO_4)$ is added and dissolved upon heating to 150° F with agitation. A measured quantity of a finely particulated calcium carbonate extender is added to the resultant solution forming a slurry which is heated to a temperature of 212° F and under continued agitation, a solution containing a controlled quantity of dissolved $Zn(SO_4)\cdot H_2O$ is added. The resultant slurry is agitated for an additional 15 minutes while maintained at a temperature of 212° F. The reaction between the sodium hydrogen phosphate and zinc sulfate produces $Zn_3(PO_4)_2\cdot 4H_2O$ which deposits on the surfaces of the calcium carbonate particles as a coating.

The resultant slurry is subjected to further agitation and the temperature is lowered to about 160° F. A measured quantity of zinc oxide in a particulated form is added and the slurry is agitated for a period of 10 minutes at 160° F to maintain a substantially uniform dispersion. Under continued agitation, a measured quantity of an aqueous slurry containing molybdenum trioxide at a temperature of 160° F is added and the resultant slurry is agitated for a further period of 1 hour while maintained at a temperature of 160° F. The molybdenum trioxide particles progressively disolve and react with the calcium carbonate particles to form calcium molybdate accompanied by a liberation of carbon dioxide, and wherein the calcium molybdate is deposited and chemically bonded on the surfaces of the residual calcium carbonate cores.

The resultant slurry is filtered and the cake is washed with three water rinses. The resultant washed cake is dried for a period of 16 hours at 195° F, whereafter it is calcined for an additional 16 hours at 400° F. The calcination treatment effects a conversion of $Zn_3(PO_4)_2\cdot 4H_2O$ to $Zn_3(PO_4(_2\cdot 2H_2O$ accompanied by the liberation of 2 molecules of the water of hydration. A control of the quantities of the reactive constituents provides a composite extended molybdate-phosphate pigment in which the PVC ratio is about 7:3.

While it will be apparent that the invention herein described is well calculated to achieve the benefits and advantages hereinabove set forth, it will be appreciated that the invention is susceptible to modification, variation and change without departing from the spirit thereof.

What is claimed is:

1. A corrosion inhibiting pigment comprising discrete particles of an average particle size up to about 25 mircons comprising a mixture of a metal molybdate compound selected from the group consisting of zinc molybdate, calcium molybdate, strontium molybdate, barium molybdate and mixtures thereof and a metal phosphate compound selected from the group consisting of zinc phosphate, calcium phosphate, magnesium phosphate and mixtures thereof, said metal molybdate compound being present on a pigment volume concentration basis of from about 2 parts up to about 3 parts per part of said metal phosphate compound.

2. The corrosion inhibiting pigment as defined in claim 1, wherein said metal molybdate compound is present on a pigment volume concentration basis of about 7 parts for every 3 parts of said metal phosphate compound.

3. The corrosion inhibiting pigment as defined in claim 1, wherein said metal molybdate compound is present in the form of an adherent coating on the surfaces of a substantially compatible particulated carrier material.

4. The corrosion inhibiting pigment as defined in claim 1, wherein said metal molybdate compound is present in the form of an adherent coating on the surfaces of a substantially compatible particulated carrier material and is present in an amount of about 2% to about 30% by weight of the combined weight of said coating and said carrier material.

5. The corrosion inhibiting pigment as defined in claim 1, wherein said metal molybdate compound and said metal phosphate compound are present in the form of an adherent coating on the surfaces of a substantially compatible particulated carrier material.

6. The corrosion inhibiting pigment as defined in claim 1, wherein said metal molybdate compound is present in the form of an adherent coating on the surfaces of a substantially compatible particulated carrier material and said metal phosphate compound is present in the form of particles in mechanical admixture therewith.

7. The corrosion inhibiting pigment as defined in claim 1, wherein said metal molybdate compound is zinc molybdate.

8. The corrosion inhibiting pigment as defined in claim 1, wherein said metal molybdate compound is calcium molybdate.

9. The corrosion inhibiting pigment as defined in claim 1, wherein said metal phosphate compound is zinc phosphate.

10. The corrosion inhibiting pigment as defined in claim 3, wherein said metal molybdate compound is calcium molybdate and said particulated carrier material is calcium carbonate.

11. In a corrosion inhibiting protective coating formulation comprising a vehicle and a solid corrosion inhibiting pigment dispersed substantially uniformly therethrough, said pigment comprising discrete particles of an average particle size up to about 25 microns; the improvement comprising, as said pigment, a mixture consisting of a metal molybdate compound selected from the group consisting of zinc molybdate, calcium molybdate, strontium molybdate, barium molybdate and mixtures thereof and a metal phosphate compound selected from the group consisting of zinc phosphate, calcium phosphate, magnesium phosphate and mixtures thereof, said metal molybdate compound being present on a pigment volume concentration basis of from about 2 parts up to about 3 parts per part of said metal phosphate compound, said corrosion inhibiting pigment being present in said vehicle in an amount sufficient to impart corrosion inhibiting properties thereto.

* * * * *